Patented Nov. 3, 1931

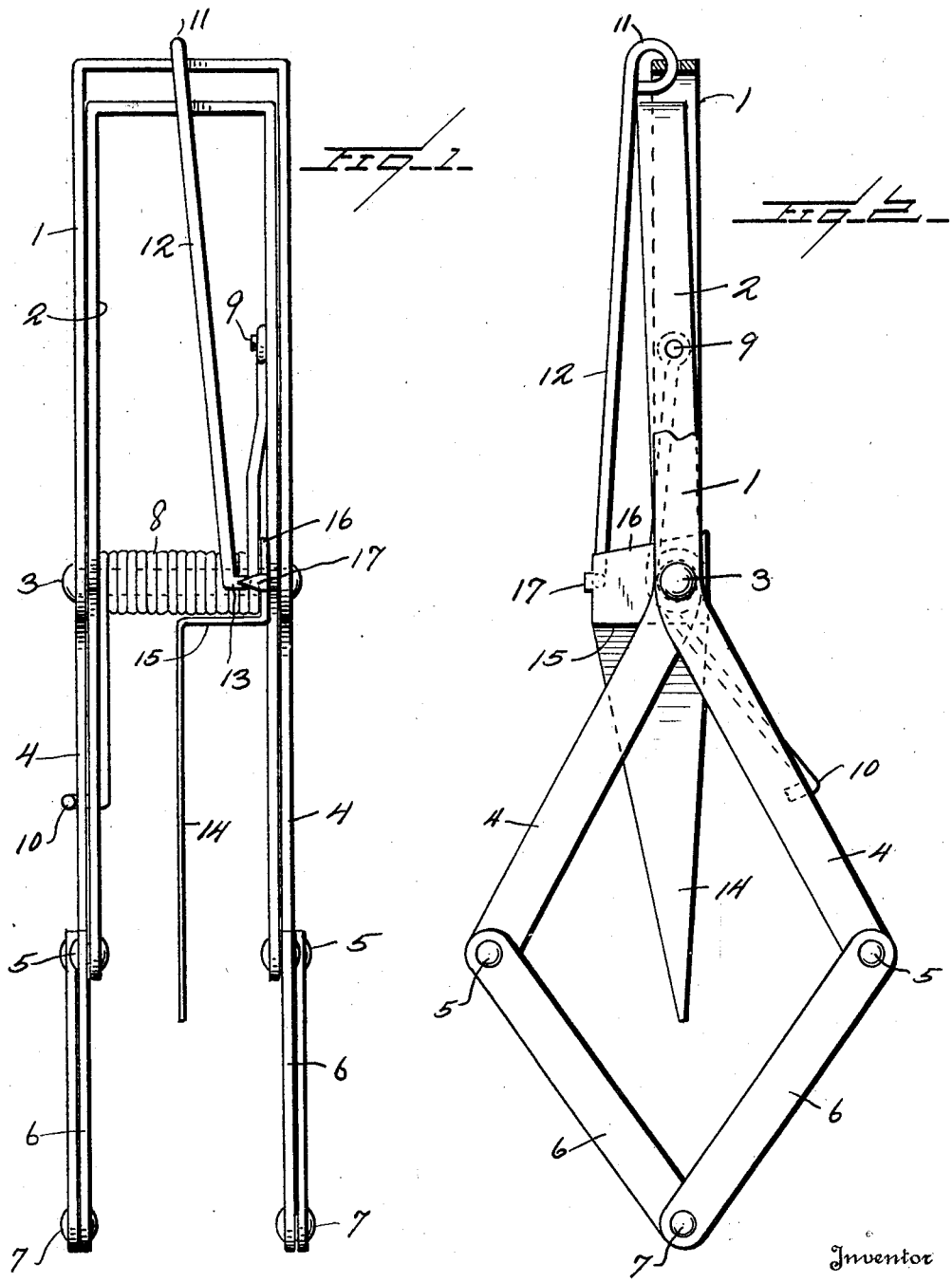

1,830,675

UNITED STATES PATENT OFFICE

WILLIAM I. RAYMOND, OF PORTLAND, OREGON, ASSIGNOR TO CHARLES EDWARD GRELLE, OF GREENHILLS, PORTLAND, OREGON

MOLE OR GOPHER TRAP

Application filed September 6, 1930. Serial No. 480,237.

This invention relates to traps designed for catching moles, gophers and like animals and particularly to certain improvements upon the trap which was illustrated, described and claimed in my Patent No. 1,764,225 granted on June 17, 1930.

My prior patent disclosed a trap designed to be inserted into the animal run-way and to extend on each side of the same, the trap being provided with a trigger element depending into the runway which is forced laterally by the animal as he attempts to pass through the runway, thus springing the trap, the trap being so constructed that two pairs of side members or frames when the trap is sprung are forced inward by the spring of the trap, thus killing the animal. In the construction which I have illustrated in my prior patent, the trigger is so mounted that in order to release the trap, it can be pressed only in one direction. As a consequence of this, it would be possible for a small animal such as a small mole to pass around the trigger at least on one side thereof if not both sides, and further it is so constructed that it is difficult to insert the trap or force the trap into the ground without springing the trigger.

The general object of my present invention, therefore, is to improve upon the construction illustrated in my prior patent by providing a trigger which is pointed and which is so mounted that it may be forced into the ground and thus forced into the runway and further to so form this trigger that the animal in squeezing through on either side of the trigger will release the trap.

Another object is to provide means which will provide for a very delicate release of the trap, thus enabling the trap to be used for very small moles about three inches long which I have found use the run of the larger Townsend mole which is from six to eight inches long. So far as I know, no other trap, other than the trap which is now to be described, has been able to catch this very small mole.

A further object is to provide a trap of this character in which the trigger is not released by the animal pressing the soil under the trigger or pressing upward on the trigger itself or pushing the trigger in the direction of the runway, but in which the trigger has a sidewise movement transverse to the runway, the animal in its effort to pass the trigger shifting the trigger sidewise.

Other objects will appear in the course of the following description.

My invention is illustrated in the accompanying drawings, wherein:—

Figure 1 is a side elevation of a trap constructed in accordance with my invention and having my improved trigger mechanism applied thereto;

Figure 2 is an end elevation of the trap, both of the figures showing the trap in a set position.

Referring to these drawings, it will be seen that my trap includes two substantially U-shaped frames designated respectively 1 and 2, one of these frames being less in transverse width than the other and positioned within the other frame. These frames are pivotally connected by a transverse bolt 3 or other equivalent means which extend through the leg portions of the frame intermediate the ends thereof. From the point where the pivot pin 3 extends through the legs of the conjoined frames 1 and 2, the two legs of each frame are bent at an obtuse angle to the upper portions thereof as indicated at 4 so that when the upper portions of the frames are in substantial alinement, the lower portions 4 of the legs of the frames will extend outwardly and downwardly in opposite directions. To the free end of each of these deflected portions 4 is pivotally attached as at 5 one end of the link member 6, the outer ends of these link members being pivotally connected to each other as at 7. Thus when the trap is set as shown in Figure 2, there will be two diamond-shaped collapsible elements disposed in spaced relation to each other and intersecting the runway so that if these elements be collapsed, the mole or other animal will be caught between the toggle links of these elements and killed.

In order to urge the upper ends of the frames into divergent relation and the lower ends of the frames into approximately alined relation, I provide a coiled spring 8 which surrounds the pivot bolt 3 and which has oppositely extending arms one of these being connected at 9 to the frame 2, the other end being extended downward and bent as at 10 to extend over the adjacent leg of the two frames as shown in Figure 1. Thus it will be seen that the tendency of the spring is to cause the closing of the jaws constituted by the deflected portions 4 of the frames and the links 6.

In order to maintain the trap in set position with the jaws spread apart or in open position, the bight end of the frame 1 has swingingly attached to it at 11 a latch 12, this latch being slightly bent at its lower end as at 13. Pivoted upon the pivoted bolt 3 is a trigger 14. This trigger is of relatively thin metal, wide at its upper end and coming down to a point at its lower end. The upper end of the trigger is laterally deflected as at 15 (see Figure 1) and then upwardly extended and from one corner of this upwardly extended portion 16 the pivot pin 3 passes. The portion 15, it will be noted is disposed directly beneath and almost bearing on the coil spring 8. The corner of the trigger opposite the pivot pin is formed with an inwardly extending V-shaped detent tooth 17 bent outward at right angles to the portion 16 and extending inward. The hooked end 13 of the latch is adapted to engage with this detent tooth 17 and when so engaged with the jaws of the trap opened, the trap will be held in closing under the action of the spring 8. This member 14 is disposed, as previously stated, with its width transversely of the animal runway and hence in order for the animal to pass this trigger which acts as an obstruction, he will try to shove past on one side or the other.

With this trigger, a movement in either direction of the trigger caused by the attempt of the animal to pass the trigger will cause the trigger to swing out of its engagement with the latch and release the latch and, of course, then the spring 8 will cause the jaws to close swiftly upon the animal, killing it.

It will be seen that with this trap, the trigger moves laterally, practically entirely, as distinguished from moving upward or pushing the trigger forward. It will likewise be seen that the jaws formed by the parts 4 and the links 6 being disposed on both sides of the runway, prevent the animal from going around to either side of the trigger or under the trigger and thus to get through the runway, the animal has to press the trigger either to one side or the other and in doing so springs the trap.

It is to be particularly noted that the portion 15 of the trigger normally is free of the coil spring 8. The shape of the trigger offers but little resistance to the soil so that the trigger may be readily forced downward into the soil and when sufficient resistance of the soil is met with, the portion 15 of the trigger will be forced up against the spring and will be supported by the spring, thus keeping the trigger in its approximately normal position parallel to the sides of the trap when the trigger is being inserted. Thus this deflected portion 15 tends to prevent the trigger from being swung out of its normal position when being forced into the soil. It will further be seen that inasmuch as the trigger is relatively thin, it will be pushed crosswise of the runway with the least possible resistance from the soil, but at the same time it resists any pushing in the direction of the runway.

The shape of the trigger and its method of suspension permits the trap to be pushed into the soil when the trap is in set position. In other words, it will be noted that the trigger is supported at one corner by the pivot pin 3 and at the other corner by the latch 12 and that thus the trigger is not liable to shift when being forced into the soil.

The trap, save in the construction of the trigger and its mounting, is practically the same as disclosed in my prior patent, but the trigger and its mounting are very much superior to the trigger and mounting shown in my prior patent for the reasons above stated and furthermore this trap with the improved trigger is adapted for trapping very small moles which would pass the trigger shown in my prior patent. By setting the latch 12 on the extreme narrow end of the V-shaped detent 17, it requires only a very small movement of the trigger to spring the trap and this movement may be, as before stated, in either direction.

By setting the trigger bar further up on the V-shaped detent, a greater movement of the trigger bar is necessitated. Thus the degree of delicacy of the trigger may be adjusted.

I claim:—

1. In a trap of the character described, a vertically depending trigger mounted for swinging movement transversely of the runway, and a latch for the trap, in one position holding the jaws apart, the trigger having a detent member with which the latch engages, the detent member being releasable from the latch upon a movement of the trigger in either direction transversely of the run-way.

2. A trap of the character described having a pair of inverted, substantially U-shaped frames arranged one within the other, a pivot pin extending between the legs of said frames, each pair having the free ends of its legs bent to extend laterally outward, link elements connecting the legs of one frame with those of the other frame, thus constituting jaws, coil springs surrounding said pivot pin to urge the jaws to a closed position, a latch swingably attached to one frame, and extending over the frame when the upper ends of the frame members are forced into approximate alinement, in combination with a trigger pivoted to the pivot pin adjacent the inner frame for lateral movement parallel to the direction of movement of the jaws and normally depending therefrom between the jaws and having a detent tooth with which the latch engages.

3. A trap of the character described having a pair of inverted, substantially U-shaped frames arranged one within the other, a pivot pin extending between the legs of said frames, each pair having the free ends of its legs bent to extend laterally outward, link elements connecting the legs of one frame with those of the other frame, thus constituting jaws, coil springs surrounding said pivot pin to urge the jaws to a closed position, a latch swingably attached to one frame, and extending over the frame when the upper ends of the frame members are forced into approximate alinement, in combination with a trigger pivoted to the pivot pin adjacent the inner frame for lateral movement parallel to the direction of movement of the jaws and normally depending therefrom between the jaws, the pivot pin being pivoted to one side of its middle and projecting outward from the pivot toward the latch and having a detent tooth engageable with the latch when the latch is in a vertically dependent position.

4. A trap of the character described having a pair of inverted, substantially U-shaped frames arranged one within the other, a pivot pin extending between the legs of said frames, each pair having the free ends of its legs bent to extend laterally outward, link elements connecting the legs of one frame with those of the other frame, thus constituting jaws, coil springs surrounding said pivot pin to urge the jaws to a closed position, a latch swingably attached to one frame, and extending over the frame when the upper ends of the frame members are forced into approximate alinement, in combination with a trigger pivoted to the pivot pin adjacent the inner frame for lateral movement parallel to the direction of movement of the jaws and normally depending therefrom between the jaws, the pivot pin being pivoted to one side of its middle and projecting outward from the pivot toward the latch and having a detent tooth engageable with the latch when the latch is in a vertically dependent position, the latch having a laterally extending portion extending beneath and bearing upon the circumference of the coiled spring to thus support the latch against upward movement when the latch is in its dependent position.

In testimony whereof I hereunto affix my signature.

WILLIAM I. RAYMOND.